US011233925B2

(12) United States Patent
Moon

(10) Patent No.: US 11,233,925 B2
(45) Date of Patent: Jan. 25, 2022

(54) ELECTRONIC DEVICE INCLUDING CAMERA MODULE AND MANUFACTURING METHOD THEREOF

(71) Applicant: Samsung Electronics Co., Ltd., Gyeonggi-do (KR)

(72) Inventor: Heecheul Moon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/000,489

(22) Filed: Aug. 24, 2020

(65) Prior Publication Data
US 2021/0120150 A1     Apr. 22, 2021

(30) Foreign Application Priority Data

Oct. 18, 2019   (KR) ........................ 10-2019-0129770

(51) Int. Cl.
| | |
|---|---|
| *H04N 5/225* | (2006.01) |
| *G03B 17/12* | (2021.01) |
| *G03B 13/34* | (2021.01) |
| *G02B 7/04* | (2021.01) |

(52) U.S. Cl.
CPC .......... *H04N 5/2252* (2013.01); *G03B 13/34* (2013.01); *G03B 17/12* (2013.01); *H04N 5/2253* (2013.01); *G02B 7/04* (2013.01)

(58) Field of Classification Search
CPC .. H04N 5/2252; H04N 5/2253; H04N 5/2254; H04N 17/002; H04N 5/2257; G03B 17/12; G03B 13/34; G02B 7/04; G02B 7/021; H04M 1/0264
See application file for complete search history.

(56) References Cited

U.S. PATENT DOCUMENTS

| | | | | |
|---|---|---|---|---|
| 10,520,662 | B1 * | 12/2019 | Chen .................... | G02B 6/0051 |
| 10,768,356 | B1 * | 9/2020 | Zhang .................. | G02B 6/0035 |
| 2014/0253799 | A1 | 9/2014 | Moon et al. | |
| 2017/0026553 | A1 * | 1/2017 | Lee .................. | G02F 1/133351 |
| 2017/0068287 | A1 | 3/2017 | Jung et al. | |

(Continued)

FOREIGN PATENT DOCUMENTS

| | | |
|---|---|---|
| CN | 107395808 A | 11/2017 |
| KR | 10-1426199 B1 | 8/2014 |

OTHER PUBLICATIONS

International Search Report dated Nov. 30, 2020.

*Primary Examiner* — Timothy J Henn
(74) *Attorney, Agent, or Firm* — Cha & Reiter, LLC

(57) ABSTRACT

An electronic device according to certain embodiments of the disclosure includes: a front plate including a transparent area and an opaque area; a display disposed under the front plate and having a first opening corresponding to at least a part of the transparent area; a support member disposed under the display and including a first area having a second opening corresponding to at least a part of the first opening and at least one second area formed to protrude under the first area; a camera module including a camera housing that includes a first surface facing the first area and a second surface formed to extend under the first surface and facing the second area, and at least one lens that is disposed in at least one of the first opening and the second opening; and an adhesive member disposed between the camera housing and the second area.

19 Claims, 11 Drawing Sheets

(56) References Cited

U.S. PATENT DOCUMENTS

| | | | |
|---|---|---|---|
| 2017/0160766 A1* | 6/2017 | Gupta | ............... H01L 27/1214 |
| 2018/0364441 A1 | 12/2018 | Hubert et al. | |
| 2019/0141220 A1 | 5/2019 | Chen et al. | |
| 2019/0243417 A1 | 8/2019 | Cheng | |
| 2019/0306296 A1 | 10/2019 | Cheng | |

* cited by examiner

ELECTRONIC DEVICE INCLUDING CAMERA MODULE AND MANUFACTURING METHOD THEREOF

CROSS-REFERENCE TO RELATED APPLICATION(S)

This application is based on and claims priority under 35 U.S.C. 119 to Korean Patent Application No. 10-2019-0129770, filed on Oct. 18, 2019, in the Korean Intellectual Property Office, the disclosure of which is herein incorporated by reference in its entirety.

TECHNICAL FIELD

The disclosure relates to an electronic device including a camera module and a manufacturing method thereof.

BACKGROUND

Electronic devices can output stored information as sounds or images. As the degree of integration of electronic devices is increased, and high-speed, high-capacity wireless communication is widely used, electronic devices such as mobile communication terminals can provide various functions. For example, electronic device can provide a communication function as well as an entertainment function such as a game, a multimedia function such as music/video playback, a communication security function for mobile banking, schedule management and an electronic wallet, to name a few.

Smaller electronic devices improve electronic device portability, while thinner electronic devices with a display that covers a proportion of the surface area of the electronic device are pleasing to consumers.

SUMMARY

An electronic device according to certain embodiments comprises a front plate including a transparent area and an opaque area; a display disposed under the front plate and including a first opening corresponding to at least a part of the transparent area; a support member disposed under the display and including a first area comprising a second opening corresponding to at least a part of the first opening and at least one second area protruding under the first area; a camera housing that includes a first surface facing the first area and a second surface extending under the first surface and facing the at least one second area, at least one lens disposed in at least one of the first opening and the second opening; and an adhesive member disposed between the camera housing and the second area.

A manufacturing method of an electronic device according to certain embodiments comprises joining a front plate having a transparent area and an opaque area and a display including a first opening corresponding to at least a part of the transparent area to a support member; adjusting a position of a camera module relative to the support member by aligning a lens axis of the camera module to be substantially identical to a midpoint of the transparent area; disposing an adhesive member between the camera module and the support member; and curing the adhesive member.

An electronic device according to certain embodiments comprises a front plate including a transparent area and an opaque area; a display disposed under the front plate and including a first opening corresponding to at least a part of the transparent area; a support member disposed under the display and including a first area comprising a second opening corresponding to at least a part of the first opening and at least one second area protruding under the first area; a camera housing that includes a first surface facing the first area and a second surface extending under the first surface and facing the at least one second area, at least one lens disposed in at least one of the first opening and the second opening; and an adhesive member disposed between the camera housing and the second area; and wherein a bottom portion of the camera housing is separated by a gap from a third area of the support member disposed under the camera housing.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

A portable electronic device may include an active area for displaying an image and an inactive area in which no image is displayed. A touch screen panel for recognizing a touch position of a user may be disposed in the active area, and a camera, a sensor, etc., may be disposed in the inactive area. A large inactive area reduces the proportion of the surface area of the electronic device that is used for displaying. This can reduce the device aesthetic appeal.

An electronic device according to certain embodiments of the disclosure has an adhesive member disposed between a camera housing and a support member, so that a size of an inactive area in which a camera is disposed can be reduced.

A manufacturing method of an electronic device according to certain embodiments of the disclosure adjusts a position of a camera module relative to an inactive area through vision alignment, so that a number of tolerances considered when the inactive area is formed, and a size of the inactive area in which a camera is disposed can be reduced.

These and other advantages of the certain embodiments will be described in further detail below.

Electronic Device

Figure 1:
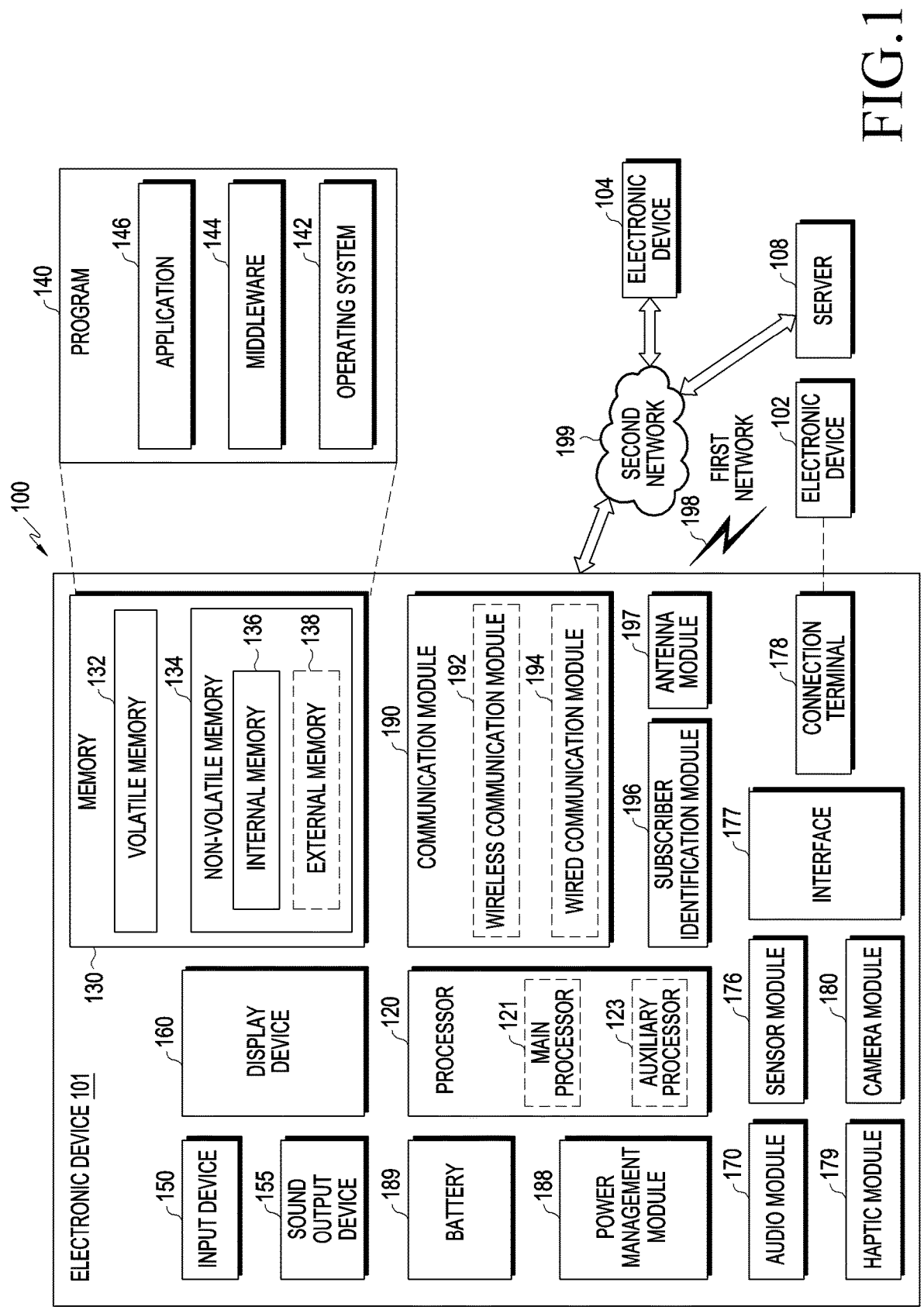
FIG. 1 is a block diagram of an electronic device within a network environment according to certain embodiments of the disclosure.
Figure 2:
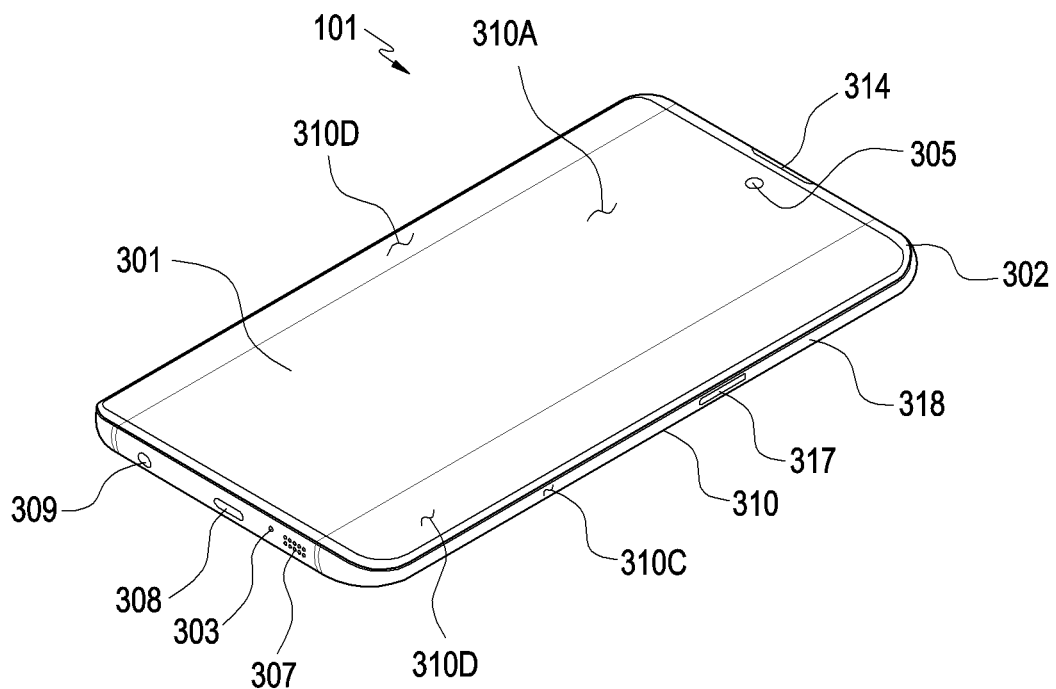
FIG. 2 is a front perspective view of an electronic device according to certain embodiments of the disclosure.
Figure 3:
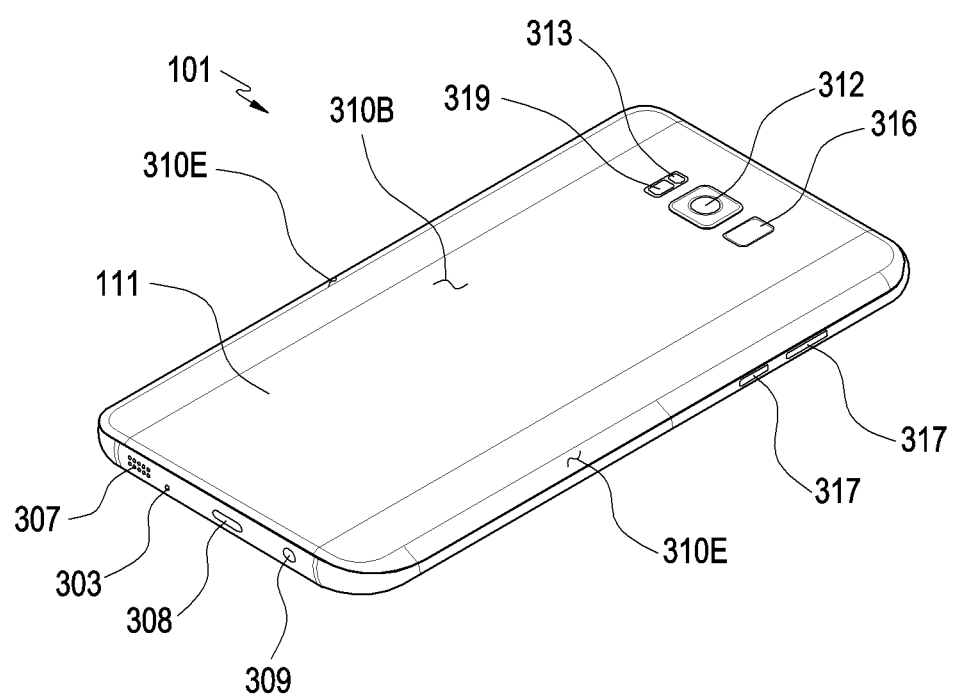
FIG. 3 is a rear perspective view of an electronic device according to certain embodiments of the disclosure.
Figure 4:
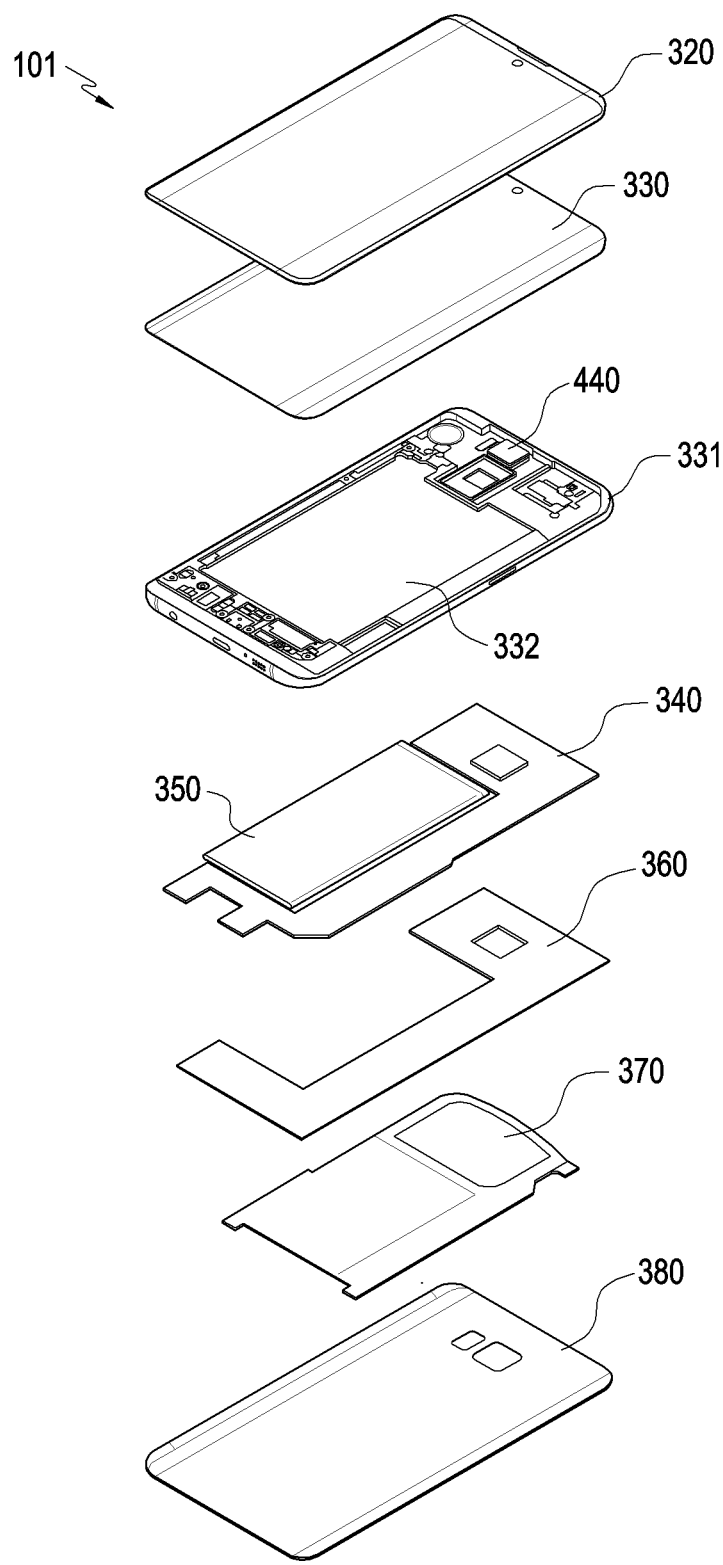
FIG. 4 is an exploded perspective view of an electronic device according to certain embodiments of the disclosure.

FIG. 1 describes an electronic device 101 where certain embodiments of the present disclosure can be practiced. FIGS. 2 and 3 describe the exterior of the housing of the electronic device. FIG. 4 describes the interior of the housing of the electronic device. As will be seen, certain embodiments include an electronic device that is generally planar and thin. It may be aesthetically appealing that a high proportion of the surface area of the electronic device is used for displaying. However, it is also desirable for the electronic device to include a camera. Since the camera uses an open line of sight to the exterior of the electronic device, the surface includes an opening. In certain embodiments, the opening is an inactive area of the display, which reduces the proportion of the surface area that is used for displaying.

FIGS. 5-11 describe a camera inside the housing of the electronic device.

Electronic Device

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The various components of the electronic device 101 provide a wide variety of functions. Various information can be output using the display device 160. In certain embodiments, it may be aesthetically pleasing to have a display device display over a high proportion of the surface area of the electronic device 100. However, a camera function provided by camera module 180 is also desired. The camera module 180 uses a line of sight to the exterior of the electronic device 100 through an opening in the surface of the electronic device.

Housing of the Electronic Device

FIG. 2 is a front perspective view of an electronic device 101 according to certain embodiments of the disclosure.

FIG. 3 is a rear perspective view of an electronic device 101 according to certain embodiments of the disclosure.

Referring to FIGS. 2 and 3, an electronic device 101 according to an embodiment may include a housing 310 that includes a first/front surface 310A, a second/rear surface 310B, and a lateral surface 310C that surrounds a space between the first surface 310A and the second surface 310B. In another embodiment (not illustrated), the housing 310 may be called a structure in which some of the first surface 310A, the second surface 310B, and the lateral surface 310C of FIG. 2 are disposed. According to an embodiment, the first surface 310A may be formed by a front plate 302 (e.g., a glass plate or a polymer plate including various coating layers), at least a part of which is substantially transparent. The second surface 310B may be formed by a substantially opaque rear plate 111. The rear plate 111 may be formed of, for instance, a coated or colored glass, a ceramic, a polymer, a metal (e.g., aluminum, stainless steel (STS), or magnesium), or a combination of at least two thereof. The lateral surface 310C may be joined with the front plate 302 and the rear plate 111, and may be formed by a lateral bezel structure (or a "lateral member") 318 including a metal and/or a polymer. In certain embodiments, the rear plate 311 and the lateral bezel structure 318 may be integrally formed, and may include the same material (e.g., a metallic material such as aluminum).

In the illustrated embodiment, the front plate 302 may include two first areas 310D, which are bent and seamlessly extend from the first surface 310A toward the rear plate 111, at both long edges of the front plate of the front plate 302. In the illustrated embodiment (see FIG. 3), the rear plate 111 may include two second areas 310E, which are bent and seamlessly extend from the second surface 310B toward the front plate 302, at both long edges thereof. In certain embodiments, the front plate 302 (or the rear plate 111) may include only one of the first areas 310D (or the second areas 310E). In another embodiment, the front plate 302 (or the rear plate 111) may not include some of the first areas 310D or the second areas 310E. In the embodiments, when viewed from the lateral surface of the electronic device 101, the lateral bezel structure 318 may have a first thickness (or width) on the side of the lateral surface in which the first areas 310D or the second areas 310E are not included, and a second thickness thinner than the first thickness on the side of the lateral surface that includes the first areas 310D or the second areas 310E.

According to an embodiment, the electronic device 101 may include at least one or more of a display 301, audio modules 303, 307, and 314, sensor modules 316 and 319, camera modules 305, 312, and 313, a key input device 317, and connector holes 308 and 309. In certain embodiments, the electronic device 101 may omit at least one (e.g., a key input device 400) of the constituent elements, or additionally include another constituent element.

The display 301 may be exposed, for instance, through a considerable portion of the front plate 302. In certain embodiments, at least a part of the display 301 may be exposed through the first surface 310A and the front plate 302 at which the first areas 310D of the lateral surface 310C are disposed. In certain embodiments, corners of the display 301 may be formed in approximately the same shape as adjacent contour shape of the front plate 302. In another embodiment (not illustrated), to expand an area to which the display 301 is exposed, an interval between a contour of the display 301 and a contour of the front plate 302 may be approximately evenly formed.

In another embodiment, a recess or an opening is formed in a part of a screen display area of the display 301, and the display 301 may include at least one or more of the sensor module (not illustrated) and the camera module 305 that are aligned with the recess or the opening. In another embodiment (not illustrated), at least one or more of the audio module 314), the sensor module (not illustrated), the camera module 305, a fingerprint sensor 316, and a light emitting element 306 may be disposed on the back of the screen display area of the display 301. In another embodiment (not illustrated), the display 301 may be joined with or disposed adjacent to a touch sensor circuit, a pressure sensor capable of measuring an intensity (a pressure) of a touch, and/or a digitizer that detects a stylus pen based on a magnetic field. In certain embodiments, at least a part of the sensor modules 304 and 319, and/or at least a part of the key input device 400 may be disposed in the first areas 310D and/or the second areas 310E.

The audio modules 303, 307, and 314 may include a microphone hole 303 and speaker holes 307 and 314. A microphone for obtaining an external sound may be disposed in the microphone hole 303 and, in certain embodiments, a plurality of microphones may be disposed to be able to detect a direction of the sound. The speaker holes 307 and 314 may include an external speaker hole 307 and a receiver hole 314 for communication. In certain embodiments, the speaker holes 307 and 314 and the microphone hole 303 may be implemented by one hole, or a speaker (e.g., a piezo speaker) may be included without the speaker holes 307 and 314.

The sensor modules 316 and 319 may produce an electric signal or a data value that corresponds to an internal operation state or an external environment state of the electronic device 101. The sensor modules 316 and 319 may include, for instance, a first sensor module 304 (e.g., a proximity sensor) and/or a second sensor module (not illustrated) (e.g., a fingerprint sensor) that is disposed on the first surface 310A of the housing 310, and/or a third sensor modules 319 (e.g., an HRM sensor) and/or a fourth sensor module 316 (e.g., a fingerprint sensor) that is disposed on the second surface 310B of the housing 310. The fingerprint sensors may be disposed on the first surface 310A (e.g., the display 310) as well as the second surface 310B of the housing 310. The electronic device 101 may further include at least one of sensor modules (not illustrated), for instance, a gesture sensor, a gyro sensor, a barometric sensor, a magnetic sensor, an acceleration sensor, a grip sensor, a color sensor, an infrared (IR) sensor, a biological sensor, a temperature sensor, a humidity sensor, or an illuminance sensor 304.

The camera modules 305, 312, and 313 may include a first camera module 305 disposed on the first surface 310A of the electronic device 101, and a second camera module 312 and/or a flash 213 disposed on the second surface 310B. The camera modules 305 and 312 may include one or more lenses, an image sensor, and/or an image signal processor. The flash 313 may include, for instance, a light emitting diode or a xenon lamp. In certain embodiments, two or more lenses (an IR camera, and wide-angle and long-distance lenses) and image sensors may be disposed on one surface of the electronic device 101.

The connector holes 308 and 309 may include a first connector hole 308 that can hold a connector (e.g., a USB connector) for transmitting/receiving power and/or data to/from an external electronic device, and/or a second connector hole (or an earphone jack) 309 that can hold a connector for transmitting/receiving an audio signal to/from the external electronic device.

In certain embodiments, it may be aesthetically pleasing to have a display 301 display items over a high proportion the first surface 310A. However, a camera function provided by camera module 305 is also desired. The camera module 305 uses a line of sight to the exterior of the electronic device 101 through an opening in the display 301 of the electronic device FIG. 4 is an exploded perspective view of an electronic device 101 according to certain embodiments of the disclosure.

Referring to FIG. 4, an electronic device 101 (e.g., the electronic device 101 of FIGS. 1 to 3) may include a lateral bezel structure 331, a first support member 332 (e.g., a bracket), a front plate 320, a display 330, a printed circuit board 340, a battery 350, a second support member 360 (e.g., a rear case), an antenna 370, and a rear plate 380. In certain embodiments, the electronic device 101 may omit at least one (e.g., the first support member 332 or the second support member 360) of the constituent elements, or additionally include another constituent element. At least one of the constituent elements of the electronic device 101 may be identical or similar to at least one of the constituent elements of the electronic device 101 of FIG. 2 or 3, and a duplicate description thereof will be omitted below.

The first support member 332 may be disposed inside the electronic device 101 and be connected with the lateral bezel structure 331, or be formed integrally with the lateral bezel structure 331. The first support member 332 may be formed of, for instance, a metallic material and/or a non-metallic material (e.g., a polymer material). The first support member 332 may be joined with the display 330 on one surface thereof, and the printed circuit board 340 on the other surface thereof. A processor, a memory, and/or an interface may be mounted on the printed circuit board 340. The processor may include, for instance, one or more of a central processing unit, an application processor, a graphic processing unit, an image signal processor, a sensor hub processor, or a communication processor.

The memory may include, for instance, a volatile memory or a non-volatile memory.

The Interface may include, for instance, a high definition multimedia interface (HDMI), a universal serial bus (USB) interface, an SD card interface, and/or an audio interface. For example, the interface may electrically or physically connect the electronic device 101 with an external electronic device, and include a USB connector, an SD card/MMC connector, or an audio connector.

The battery 350 is a unit for supplying power to at least one constituent element of the electronic device 101, and may include, for instance, a non-rechargeable (primary) battery, a rechargeable (secondary) battery, or a fuel cell. For example, at least a part of the battery 350 may be disposed in substantially the same plane as the printed circuit board 340. The battery 350 may be integrally disposed inside the electronic device 101, or be disposed to be attachable/detachable to/from the electronic device 101.

The antenna 370 may be disposed between the rear plate 380 and the battery 350. The antenna 370 may include, for instance, a near field communication (NFC) antenna, a wireless charging antenna, and/or a magnetic secure transmission (MST) antenna. For example, the antenna 370 may perform near field communication with an external electronic device, or may wirelessly transmit/receive power required for charging. In another embodiment, an antenna structure may be obtained by some of the lateral bezel structure 331 and/or the first support member 332, or a combination thereof.

According to certain embodiments of the disclosure, the electronic device may include a plurality of communication units 390. For example, some of the plurality of communication units 390 may be implemented to transmit/receive radio waves having characteristics different from each other (tentatively called radio waves of A and B frequency bands) for the purpose of multiple input multiple output (MIMO) implementation. As another example, some of the plurality of communication units 390) may be set, for instance, to simultaneously transmit/receive radio waves having characteristics identical to each other (tentatively called radio waves of A1 and A2 frequencies in the A frequency band) for the purpose of diversity implementation. As yet another example, some of the plurality of communication units 390 may be set, for instance, to simultaneously transmit/receive radio waves having characteristics identical to each other (tentatively called radio waves of B1 and B2 frequencies in the B frequency band) for the purpose of the diversity implementation. In an embodiment of the disclosure, the electronic device may include two communication units. However, in another embodiment of the disclosure, the electronic device 101 may four communication units, and implement both the MIMO and the diversity. In yet another embodiment, the electronic device 101 may include only one of the communication units 390.

According to an embodiment, in the case where one of the communication unit is disposed at a first position of the printed circuit board 340 in view of transmitting/receiving characteristics of the radio waves, the other communication unit may be disposed at a second position separated from the first position of the printed circuit board 340. As another example, one communication unit and the other communication unit may be disposed in view of a mutual separation distance according to a diversity characteristic.

According to an embodiment, at least one of the communication units 390 may include a wireless communication circuit that processes radio waves transmitted/received in an extremely high frequency band (e.g., between 6 GHz and 300 GHz). A radiation conductor(s) of the at least one communication unit 390 may include, for instance, a patch type radiation conductor or a radiation conductor having a dipole structure extending in one direction, and a plurality of radiation conductors may be arrayed to obtain an antenna array. A chip (e.g., an integrated circuit chip) or the like into which a part of the wireless communication circuit is implemented may be disposed on one side of a area in which the radiation conductor is disposed or a surface that faces the opposite direction of a surface on which the radiation conductor is disposed, and may be electrically connected to the radiation conductor(s), for instance, wiring formed of a printed circuit pattern.

As can be seen, the lateral bezel includes a camera module 440. The camera module uses a line of sight to the exterior of the electronic device 101. In certain embodiments, the line of sight includes an opening in the display 330. The opening can potentially reduce the proportion of the surface area and surface 310A that is used for displaying.

Figure 5:
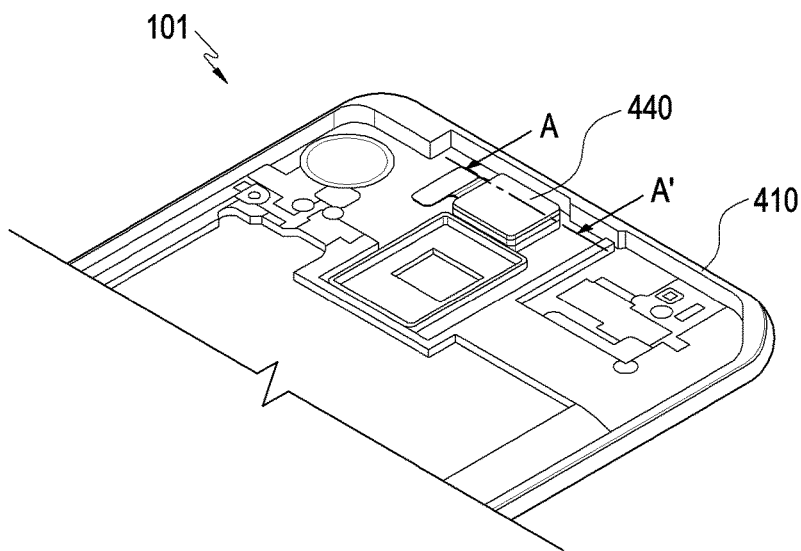
FIG. 5 is a perspective view of an electronic device, to which a camera module is joined, according to certain embodiments of the disclosure.

FIG. 5 is a perspective view of an electronic device, to which a camera module is joined, according to certain embodiments of the disclosure.

Figure 6:
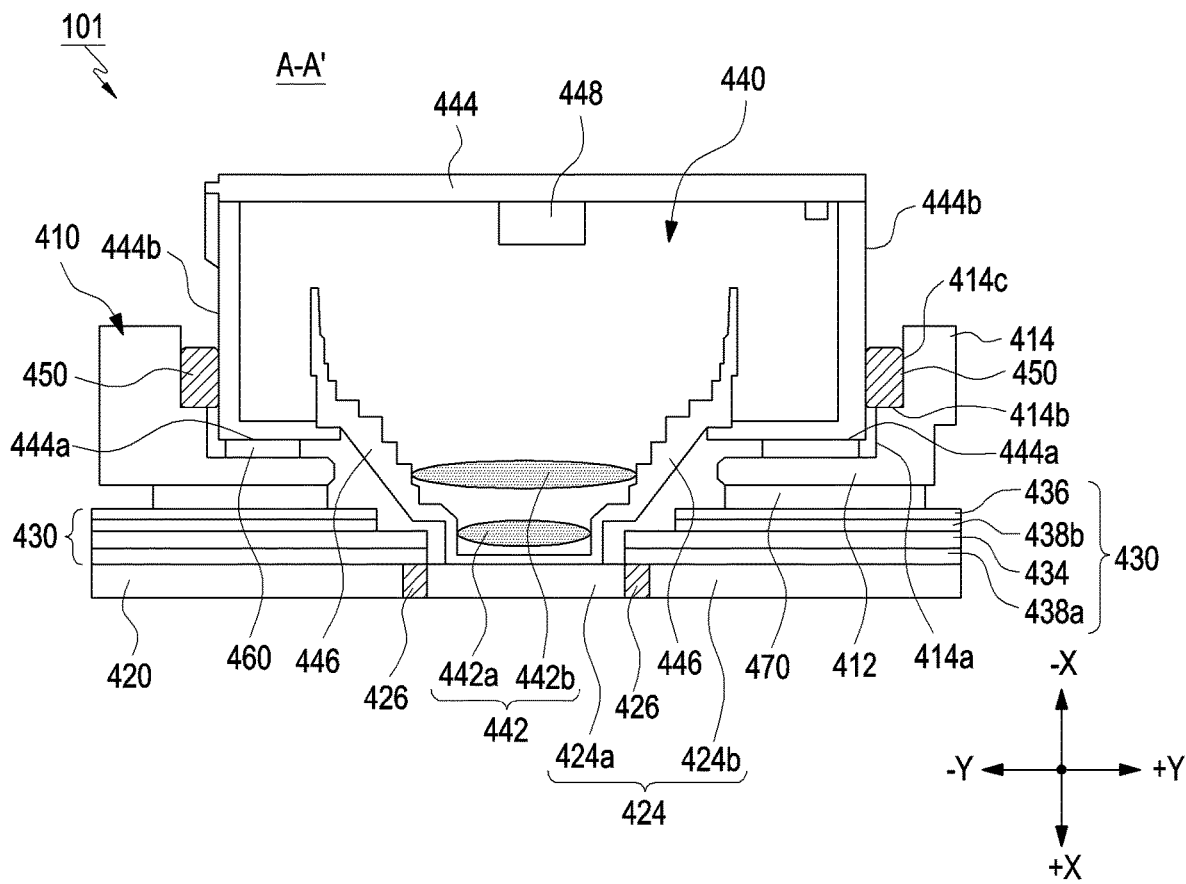
FIG. 6 is a sectional view of A-A' plane of FIG. 5.

FIG. 6 is a sectional view of A-A' plane of FIG. 5.

According to FIGS. 5 and 6, the electronic device 101 may include a support member 410, a front plate 420, a display 430, a camera module 440, an adhesive member 450, and a sealing member 460. Configurations of the support member 410, the front plate 420, the display 430, and the camera module 440 of FIGS. 5 and 6 may be the same as them of the first support member 332, the front plate 320, the display 330, and the camera module 180 or 305 of FIGS. 1 to 4 in whole or in part.

According to certain embodiments, the front plate 420 may form the exterior of the electronic device 101. For example, one surface of the front plate 420 may form a first surface (e.g., the first surface 310A of FIG. 2) of the electronic device 101, and the other surface of the front plate 420 may be in contact with the display 430. In the case where the display 430 outputs a display screen, the electronic device 101 may output the display screen from the display 430 through the front plate 420.

The display 430 may be disposed under the front plate 420. For example, the display 430 may be disposed in a second direction (a –X direction) of the front plate 420, and the screen output from the display 430 may be provided to a user through the front plate 420.

The display 430 may include various configurations in order to output a screen and to detect an input of a user into the electronic device 101. For example, the display 430 may include a pixel layer 434 for outputting a screen, a touchscreen panel 436 for detecting an input of a user, a first adhesive layer 438a that joins the pixel layer 434 with the front plate 420, and a second adhesive layer 438b that joins the touchscreen panel 436 with the support member 410. According to an embodiment, the pixel layer 434 and the touchscreen panel 436 may have shapes defining a first opening (e.g., a first opening 432 of FIG. 9A) is formed. According to another embodiment, the pixel layer 434 may have a shape that includes the first opening 432, and the touchscreen panel 436 may have a shape that includes no opening.

According to certain embodiments, the display 430 may further include an additional adhesive layer for joining the pixel layer 434 and the touchscreen panel 346 with the electronic device 101 in addition to the first adhesive layer 438a and the second adhesive layer 438b. For example, the display 430 may be joined with the support member 410 through the third adhesive layer 470.

According to certain embodiments, the support member 410 may support various configurations of the electronic device 101. For example, at least one of the display 430 and the camera module 440 may be joined to the support member 410, so that vibration can be prevented.

According to certain embodiments, the support member 410 may be formed in various shapes. For example, the support member 410 may include a first area 412 and at least one second area 414 that are disposed below the display 430. According to an embodiment, the first area 412 may be one area of the support member 410 which is substantially parallel with the display 430. According to an embodiment, the second area 414 may be an area that protrudes from the first area 412 in the second direction (the –X direction). For example, the second area 414 may include at least one of a rib, a protrusion area, or a partition that protrudes from the first area 412.

According to certain embodiments, the second area 414 of the support member 410 may be formed in various shapes in order to be joined with the camera module 440. According to an embodiment, the second area 414 may be formed in a stepped shape. For example, the second area 414 may include a third surface 414a that faces a second surface 444b of the camera module 440, a fourth surface 414b that extends from the third surface 414a in a direction different from a direction of the third surface 414a, and a protrusion 414c that protrudes from the fourth surface in the second direction (the –X direction) under the fourth surface 414b.

The fourth surface 414b may be formed to face various directions. According to an embodiment, the fourth surface 414b may be formed in a direction that is substantially parallel with the first surface 444a. According to another embodiment, the fourth surface 414b may be formed to extend from the third surface 414a in one direction between the second direction (the −X direction) and a third direction (a +Y direction). The fourth surface 414b may be formed in various shapes. For example, the fourth surface 414b may be formed into a flat or curved surface. According to certain embodiments, the protrusion 414c protrudes from the fourth surface 414b in the second direction (the −X direction) may be formed in various shapes. According to an embodiment, the protrusion 414c may be formed in a stepped shape. For example, the protrusion 414c may include at least one surface that faces the second direction (the −X direction) and at least one surface that faces the third direction (the +Y direction). The protrusion 414c may be formed in a rectangular parallelepiped including a rib that faces the second surface 444b of a camera housing 444.

According to certain embodiments, the second area 414 may be formed in various shapes in order to support the camera module 440. For example, the second area 414 may face at least one surface of the camera module 440 formed in a hexahedral shape. A plurality of second areas 414 may be formed, and face the second surface 444b of the camera module 440 at a plurality of points. According to another embodiment, the second area 414 may face the second surface 444b on one surface. According to yet another embodiment, the second area 414 may be formed in a shape that surrounds the second surface 444b of the camera module 440.

According to certain embodiments, the camera module 440 disposed inside the electronic device 101 may obtain an image of the outside of the electronic device 101. For example, the camera module 440 may be disposed on the support member 410, and obtain an image of the outside through a first transparent area 424a.

According to certain embodiments, the camera module 440 may include at least one lens 442. According to an embodiment, the at least one lens 442 can adjust a focus of an image sensor 448 that faces a first direction (a +X direction). For example, the camera module 440 may adjust the focus of the image sensor 448 using a first lens 442a and a second lens 442b that form the same virtual axis.

According to certain embodiments, the camera module 440 may obtain an image of the outside of the first transparent area 424a of the front plate 420 through the at least one lens 442. The at least one lens 442 may be disposed in the camera housing 440 that corresponds to at least one of the first opening 432 and a second opening 418. For example, the at least one lens 442 may be disposed in the body tube 446.

According to certain embodiments, the camera module 440 may include the camera housing 444. The camera housing 444 forms the exterior of the camera module 440 and in which components of the camera module 440 are disposed. The camera housing 440 may be formed in various shapes. According to an embodiment, the camera housing 444 may include a first surface 444a that faces the first area, and a second surface 444b that is formed to extend under the first surface 444a and faces the second area 414. A direction under the first surface 444a may be defined as the second direction (the −X direction).

According to certain embodiments, the camera housing 444 may include the body tube 446. The body tube 446 may be formed to extend from the first surface 444a in the first direction (the +X direction), and be disposed in the first opening 432 and the second opening 418. For example, the body tube 446 may be formed to extend from the first surface 444a to the front plate 420 through the first opening 432 and the second opening 418. According to an embodiment, the body tube 446 may be in contact with the first transparent area 424a of the front plate 420. The body tube 446 may be disposed apart from the first transparent area 424a of the front plate 420 by a given distance.

According to certain embodiments, the adhesive member 450 may adhere the support member 410 to the camera module 440. The adhesive member 450 may be cured in contact with the second area 414 of the support member 410 and the second surface 444b of the camera housing 444, and may join the camera module 440 to the support member 410. According to another embodiment, the adhesive member 450 may be cured in contact with the third surface 414a, the fourth surface 414b, and the protrusion 414c of the support member 410, and may join the camera module 440 to the support member 410. As an area where the adhesive member 450 is in contact with the support member 414 increases, an adhesive force between the camera module 400 and the support member 410 can be increased.

According to certain embodiments, the adhesive member 450 may comprise various materials. According to an embodiment, in the case where predetermined conditions are satisfied, the adhesive member 450 may comprise a curable material. For example, in the case where the predetermined conditions are satisfied, the adhesive member 450 may be changed from a liquid state to a solid state. The adhesive member 450 may comprise at least one of polyurethane, silicone, or an epoxy resin. The predetermined conditions may be conditions on which one of ultraviolet curing, natural curing, or hot air curing is applied to the adhesive member 450 of the liquid state.

According to certain embodiments, the electronic device 101 may include the sealing member 460. The sealing member 460 may be disposed between the support member 410 and the camera housing 444 in order to prevent the adhesive member 450 from infiltrating into an angle of view A of the camera module 440. For example, the sealing member 460 may be formed in a shape surrounding the second opening 418. According to an embodiment, the sealing member 460 may be disposed between the first area 412 of the support member 410 and the first surface 444a of the camera housing 444 in a shape of a closed curve. According to another embodiment, the sealing member 460 may be disposed between the second area 414 of the support member 410 and the second surface 444b of the camera housing 444 in a shape of a closed curve.

According to an embodiment, the sealing member 460 may comprise a porous material. For example, the sealing member 460 may comprise a sponge.

Figure 7:
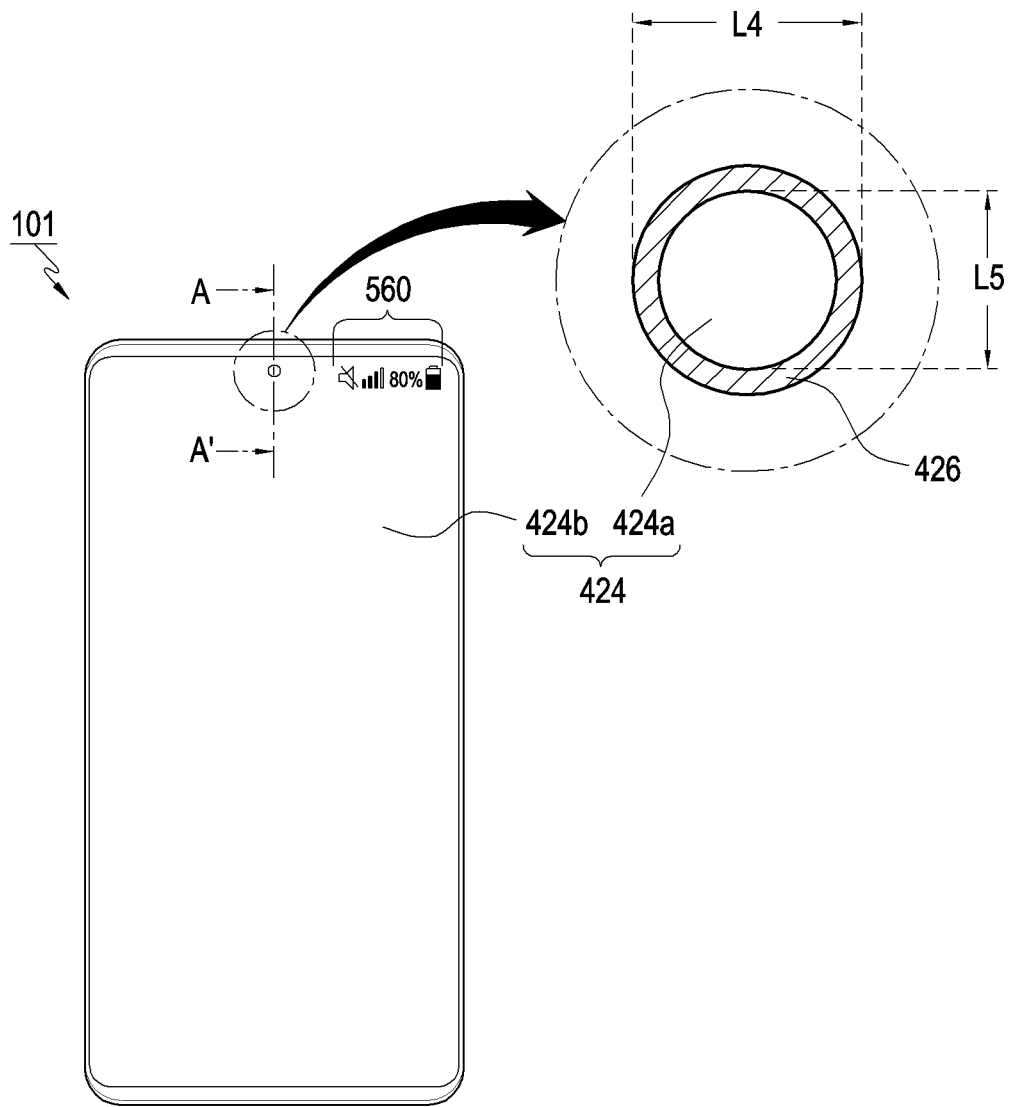
FIG. 7 is a front view of an electronic device according to certain embodiments of the disclosure.
Figure 8:
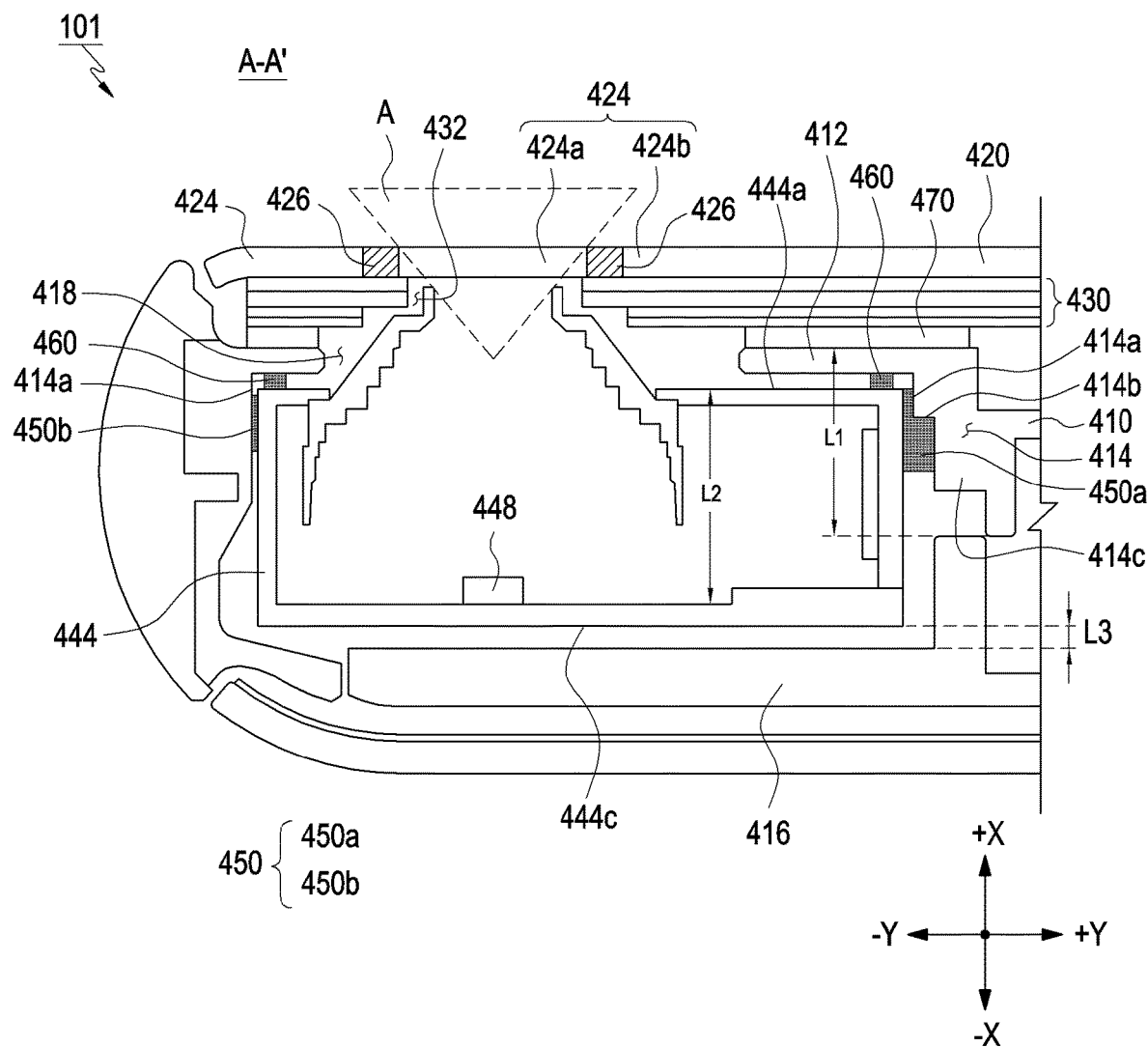
FIG. 8 is a sectional view of A-A' plane of FIG. 7.

FIG. 7 is a front view of an electronic device according to certain embodiments of the disclosure. FIG. 8 is a sectional view of A-A' plane of FIG. 7.

According to FIGS. 7 and 8, the electronic device 101 may include a support member 410, a front plate 420, a display 430, a camera module 440, and an adhesive member 450. Configurations of the support member 410, the front plate 420, the display 430, the camera module 440, and the adhesive member 450 of FIGS. 7 and 8 may be the same as those of the support member 410, the front plate 420, the display 430, the camera module 440, and the adhesive member 450 of FIGS. 5 and 6 in whole or in part.

According to certain embodiments, the front plate 420 may include a substantially transparent area 424 and a substantially opaque area 426. For example, the front plate 420 may be formed of tempered glass. According to an embodiment, the opaque area 426 may be defined as one area in which paint of an opaque material is applied to the front plate 420, and the transparent area 424 may be defined as one area of the front plate 420 which has higher transmittance of light than the opaque area 426.

According to certain embodiments, the transparent area 424 may be formed in various shapes. For example, the transparent area 424 may include a first transparent area 424a that faces the camera module 400 and a second transparent area 424b that faces the display 430 for outputting a screen. The opaque area 426 may be formed in a shape surrounding the first transparent area 424a.

According to certain embodiments, at least one of the first transparent area 424a or the opaque area 426 may be formed in a size that is substantially similar to an icon 560 configured to be displayed on the display (e.g., the display 430 of FIG. 6) in order to provide aesthetic appeal.

According to certain embodiments, a first opening 432, at least a part of which corresponds to the transparent area 424, may be formed in the display 430. For example, at least a part of the first opening 432 may correspond to the first transparent area 424a. According to an embodiment, the first opening 432 corresponding to the first transparent area 424a may stand for an opening that is formed apart from the first transparent area 424a in a second direction (a −X direction).

According to certain embodiments, a second opening 418 corresponding to at least a part of the first opening 432 may be formed in a first area 412 of the support member 410. For example, the second opening 418 may be formed in the first opening 432 and the first area 412 of the support member 410 which corresponds to the second transparent area 424b. The camera module 440 disposed on the support member 410 may obtain an outside image through the second opening 418. According to an embodiment, the second opening 418 corresponding to the first opening 432 may be an opening that is spaced apart from the first opening 432 in the second direction (the −X direction) and is formed in the support member 410.

According to certain embodiments, the camera module 440 may include an image sensor 448 directed in a first direction (an +X direction) that faces the outside of the electronic device 101. The image sensor 480 may obtain an image within the angle of view A through the first transparent area 424a. The angle of view A may be located within the first transparent area 424a, and may not overlap the opaque area 426.

According to certain embodiments, the support member 410 and the camera module 440 may be formed in various shapes in order to cure the adhesive member 450. A first length L1 of the second area 414 in the first direction (the +X direction) may be shorter than a second length L2 of the second surface 444b of the camera housing 444 in the first direction (the +X direction).

According to certain embodiments, a quantity of light absorbed by the adhesive member 450 may be changed on the basis of the shape of the support member 410. For example, a quantity of light (e.g., ultraviolet light) absorbed by the adhesive member 450 when the first length L1 is shorter than the second length L2 may be greater than a quantity of light absorbed by the adhesive member 450 when the first length L1 is longer than the second length L2. The quantity of light may be defined as at least one of luminous flux or luminous intensity. A time for which the adhesive member 450 is cured may be changed on the basis of the quantity of light absorbed by the adhesive member 450. For example, the curing time of the adhesive member 450 located at the support member 410 in which the first length L1 of the second area 414 is formed to be shorter than the second length L2 may be shorter than that of the adhesive member 450 located at the support member 410 in which the first length L1 of the second area 414 is formed to be longer than the second length L2.

According to certain embodiments, the support member 410 may further include a third area 416 that is substantially parallel to the first area 412. The camera housing 444 may be disposed in a space defined by the first area 412, the second area 414, and the third area 416.

According to certain embodiments, the camera housing 444 may include a fifth surface 444c that faces the third area 416. The fifth surface 444c may be disposed apart from the third area 416. The adhesive member 450 may not be disposed between the fifth surface 444c and the third area 416. Because an empty space having a thickness of a third length L3 is formed between the fifth surface 444c and the third area 416, there is a wider tolerance for insertion of the camera module 440 when the electronic device 101 is manufactured.

According to certain embodiments, the adhesive member 450 may be disposed between the support member 410 and the camera module 440 in various shapes. For example, the adhesive member 450 may be formed to correspond to the shapes of the support member 410 and the camera housing 444. In the case where the second area 414 of the support member 410 is formed in a stepped shape, a first adhesive member 450a may be in contact with the third surface 414a, the fourth surface 414b, and the protrusion 414c of the second area 414, and the camera housing 444. According to another embodiment, in the case where the second area 414 of the support member 410 is formed to protrude in the second direction (the −X direction), a second adhesive member 450b may be in contact with the second area 414 and the camera housing 444.

Figure 9A:
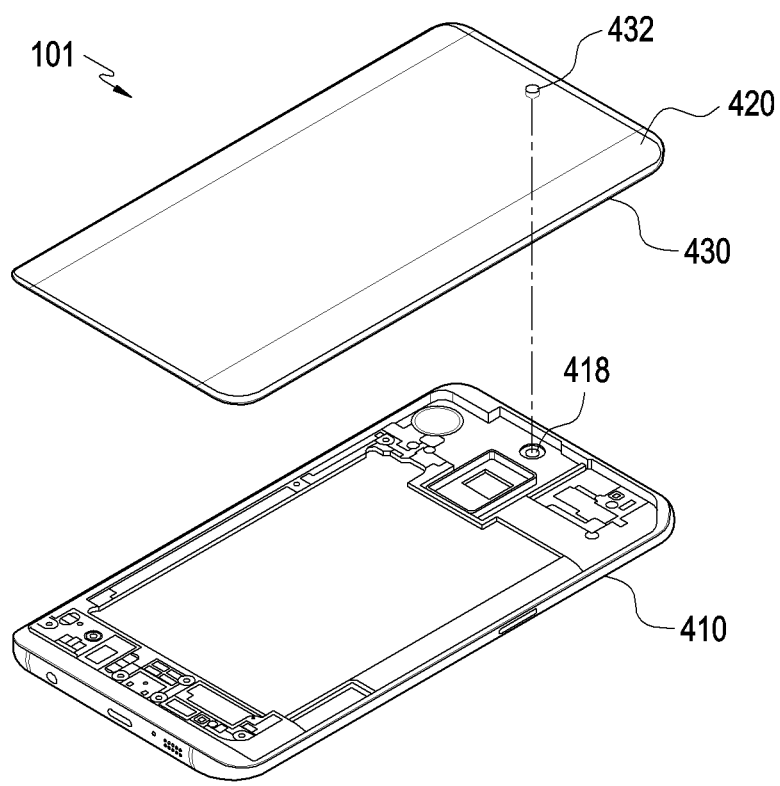
FIG. 9A is a view illustrating a manufacturing method of an electronic device according to certain embodiments of the disclosure.
Figure 9B:
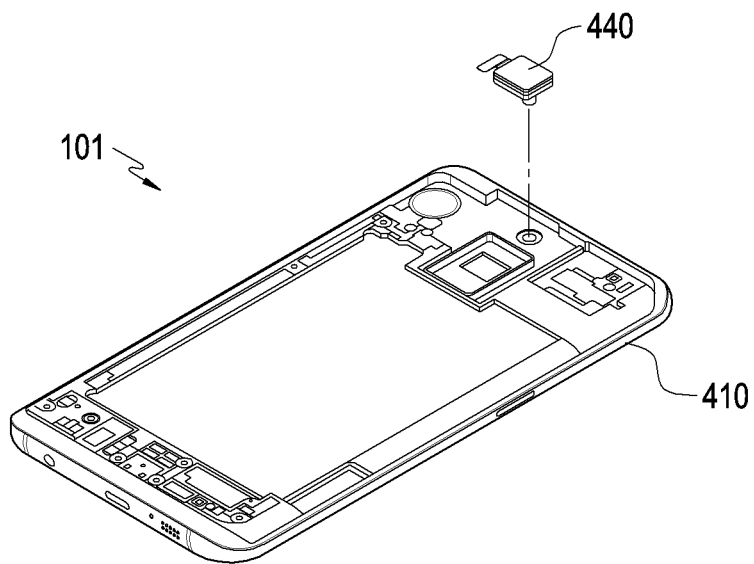
FIG. 9B is a view illustrating a manufacturing method of an electronic device according to certain embodiments of the disclosure.
Figure 9C:
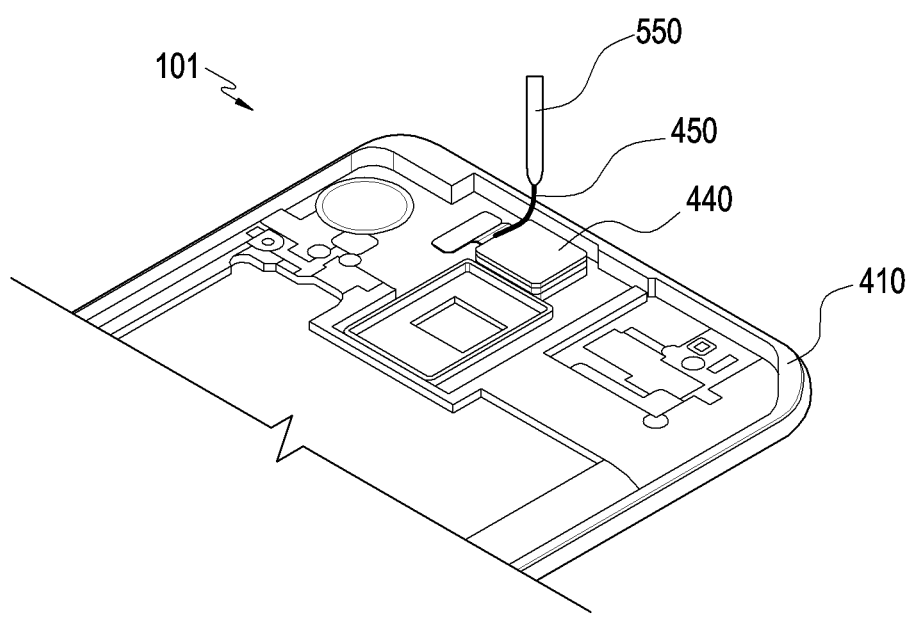
FIG. 9C is a view illustrating a manufacturing method of an electronic device according to certain embodiments of the disclosure.
Figure 10:
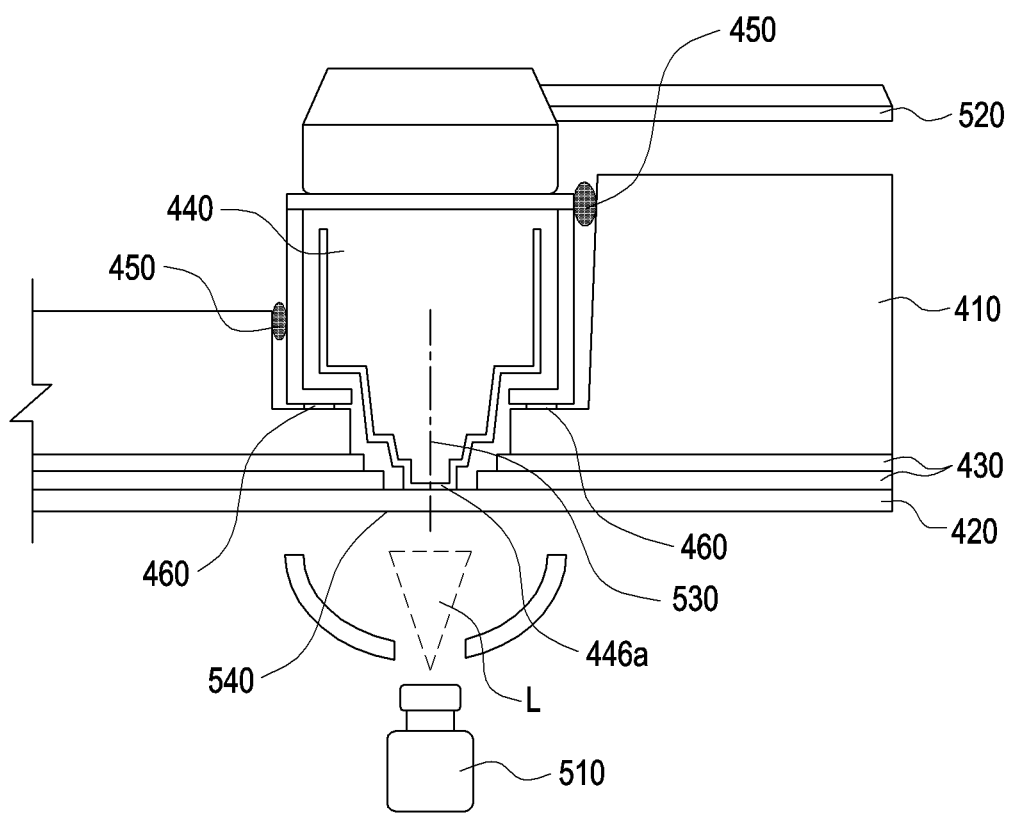
FIG. 10 is a view illustrating a method of joining a camera module to a support member according to certain embodiments of the disclosure.
Figure 11:
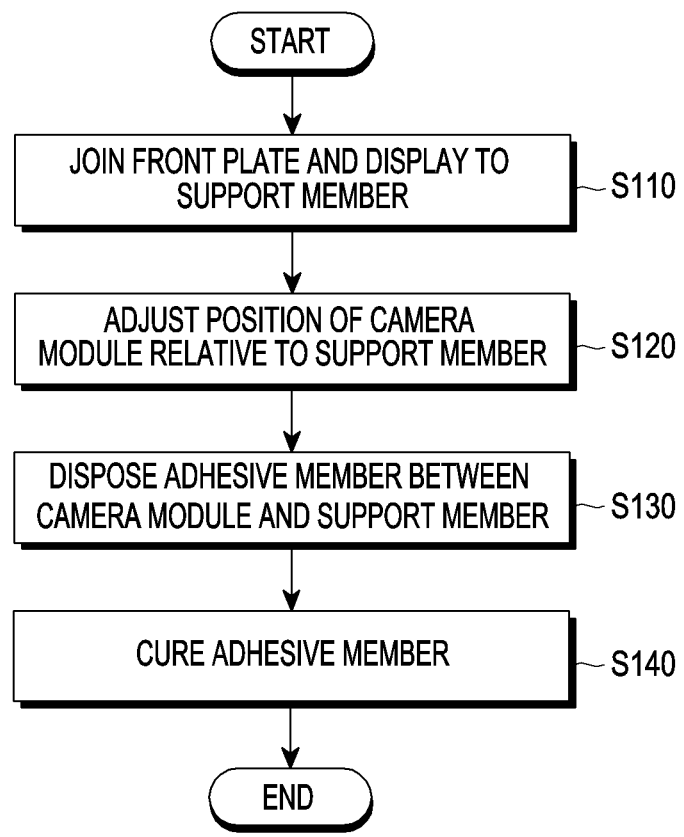
FIG. 11 is a flow chart illustrating the manufacturing method of an electronic device according to certain embodiments of the disclosure.

FIG. 9A is a view illustrating a manufacturing method of an electronic device according to certain embodiments of the disclosure, FIG. 9B is a view illustrating a manufacturing method of an electronic device according to certain embodiments of the disclosure, and FIG. 9C is a view illustrating a manufacturing method of an electronic device according to certain embodiments of the disclosure. FIG. 10 is a view illustrating a method of joining a camera module to a support member according to certain embodiments of the disclosure. FIG. 11 is a flow chart illustrating the manufacturing method of an electronic device according to certain embodiments of the disclosure.

According to FIGS. 9 to 11, a manufacturing method of an electronic device 101 may include a joining the front plate 420 and the display 430 to the support member 410 (S110), adjusting a position of the camera module 440 relative to the support member 410 (S120), a disposing the adhesive member 450 between the camera module 440 and the support member 410 (S130), and curing the adhesive member 450 (S140). Configurations of the electronic device 101, the support member 410, the front plate 420, the display 430, the camera module 440, and the adhesive member 450 of FIGS. 9 to 11 may be the same as those of the electronic device 101, the support member 410, the front plate 420, the display 430, and the camera module 440 of FIGS. 5 and 6 in whole or in part.

According to certain embodiments, the manufacturing method of an electronic device 101 may include a first process of joining the front plate 420 in which a substantially transparent area (e.g., the transparent area 424 of FIG. 7) and a substantially opaque area (e.g., the opaque area 426 of FIG. 7) are formed and the display 430 in which a first opening (e.g., the first opening 418 of FIG. 8), at least a part of which corresponds to the transparent area 424, is formed to the support member 410 (S110).

According to FIG. 9A, the front plate 420 and the display 430 may be joined to one surface of the support member 410 in a joined state. For example, the front plate 420 may be joined with the display 430 such that a first transparent area (e.g., the first transparent area 424a of FIG. 7) corresponds to the first opening 418. An assembly in which the front plate 420 and the display 430 are joined may be joined such that the first opening 432 corresponds to the second opening 418 of the support member 410. According to an embodiment, the front plate 420 and the display 430 may be joined via a first adhesive layer (e.g., the first adhesive layer 438a of FIG. 6). According to an embodiment, the joined front plate 420 and display 430 may be joined to a first area (e.g., the first area 412 of FIG. 6) of the support member 410 via a third adhesive layer (e.g., the third adhesive layer 470 of FIG. 6). According to another embodiment, the front plate 420 and the display 430 may be joined to the support member 410. For example, the display 430 may be joined to one surface of the support member 410, and the front plate 420 may be joined to one surface of the display 430.

According to certain embodiments, the display 430 and the support member 410 may be disposed such that the first opening 432 formed in the display 430 overlaps at least a part of the second opening 418 formed in the support member 410. According to an embodiment, an area of the second opening 418 may be formed to be larger than that of the first opening 432. For example, when viewed in the second direction (the −X direction), the first opening 432 may overlap the second opening 418.

According to certain embodiments, the manufacturing method of an electronic device 101 may include a second process of adjusting a position of the camera module 440 relative to the support member 410 through vision alignment in order to align an axis of a lens (e.g., the lens 442 of FIG. 6) of the camera module 440) to be substantially identical to a midpoint of a transparent area (e.g., the first transparent area 424 of FIG. 7) (S120). According to an embodiment, the lens axis may be defined as a virtual lens axis formed by a first lens (e.g., the first lens 442a of FIG. 6) and a second lens (e.g., the second lens 442b of FIG. 6). According to another embodiment, the lens axis may be defined as a central axis of a body tube (e.g., the body tube 446 of FIG. 6). The midpoint of the transparent area may be defined as a midpoint of a first transparent area (e.g., the first transparent area 424a of FIG. 7). For example, the first transparent area 424a may be formed in a circular shape, and the origin of the first transparent area 424a may be defined as the midpoint of the first transparent area 424a.

According to FIGS. 9B and 10, the position of the camera module 440 may be adjusted relative to the support member 410 through vision alignment. According to an embodiment, a shape of a sixth surface 446a of the body tube 446 which is a surface facing the front plate 420 and a shape of a first transparent area (e.g., the first transparent area 424a of FIG. 7) may be obtained through light L emitted from a vision camera 510 disposed outside.

According to certain embodiments, the camera module 440 may be disposed on the support member 410 to which the front plate 420 and the display 430 are joined through a jig 520. For example, the jig 520 for adjusting the position of the camera module 440 may align the axis of the lens (e.g., the lens 442 of FIG. 6) of the camera module 440) to be substantially identical to the axis of the first transparent area 424a in consideration of the obtained shape of the sixth surface 446a of the body tube 446 and the obtained shape of the first transparent area 424a. According to an embodiment, because the first transparent area 424a is defined as a transparent area (e.g., the transparent area 424 of FIG. 7) surrounded by an opaque area (e.g., the opaque area 426 of FIG. 7), the camera module 440 may be disposed such that the axis of the lens 442 and the axis of the opaque area 426 are substantially identical to each other. The camera module 440 may be joined with the jig 520 using vacuum suction, and the position thereof may be adjusted relative to the support member.

According to certain embodiments, the manufacturing method of an electronic device 101 may include a third process of disposing the adhesive member 450 between the camera module 440 and the support member 410) (S130). For example, the adhesive member 450 may be disposed between the second area 414 of the support member 410 and the second surface (e.g., the second surface 444b of FIG. 6) of the camera housing (e.g., the camera housing 444 of FIG. 6). According to an embodiment, the adhesive member 450 may be disposed between the second area 414 and the second surface 444b in a fluid state.

According to FIGS. 9C and 10, the adhesive member 450 may be disposed between the camera module 440 and the support member 410 through various methods. For example, the adhesive member 450 may be disposed between the camera module 440 and the support member 410 on the basis of at least one of applying, injecting or spraying. According to an embodiment, the adhesive member 450 may be supplied by an external application unit 550, and be disposed on the support member 410.

According to certain embodiments, the adhesive member 450 may be disposed at various positions in a space between the camera module 440 and the support member 410. According to an embodiment, the adhesive member 450 may be disposed to surround the camera module 440 and the support member 410 in the shape of a closed curve. For example, the adhesive member 450 may be disposed in a shape surrounding the second surface 444b of the camera housing 444. According to another embodiment, the adhesive member 450 may be disposed in a shape surrounding a part of the camera module 440. For example, the adhesive member 450 may be disposed at a part of the second surface 444b of the camera module 440.

According to certain embodiments, the manufacturing method of an electronic device 101 may include a fourth process of curing the adhesive member 450 (S140). The adhesive member 450 disposed in a fluid state in third process S130 may be changed in a solid state in fourth process S140.

According to certain embodiments, the adhesive member 450 may be cured through various methods. For example, the adhesive member 450 may be cured through at least one of ultraviolet curing, natural curing, or hot air curing. According to an embodiment, the adhesive member 450 may be formed of a material cured when absorbing ultraviolet light, and be cured by absorbing ultraviolet light irradiating the electronic device 101. According to another embodiment, the adhesive member 450 may be formed of a material cured at room temperature, and be cured when a given time has elapsed after the adhesive member 450 is disposed. According to yet another embodiment, the adhesive member 450 may be formed of a material cured when absorbing a given quantity of heat, and the adhesive member 450 disposed between the support member 410 and the camera module 440 may be cured when absorbing a given quantity of heat.

According to certain embodiments of the disclosure, an electronic device includes: a front plate (e.g., a front plate 420 of FIG. 6) in which a substantially transparent area (e.g., a transparent area 424 of FIG. 7) and a substantially opaque area (e.g., an opaque area 426 of FIG. 7) are formed; a display (e.g., a display 430 of FIG. 6) which is disposed under the front plate and in which a first opening (e.g., a first opening 432 of FIG. 8) corresponding to at least a part of the transparent area is formed; a support member (e.g., a support member 410 of FIG. 6) that is disposed under the display and includes a first area (e.g., a first area 412 of FIG. 6) in which a second opening (e.g., a second opening 418 of FIG. 8) corresponding to at least a part of the first opening and at least one second area (e.g., a second area 414 of FIG. 6) formed to protrude under the first area; a camera module (e.g., a camera module 440 of FIG. 5) that includes a camera housing (e.g., a camera housing 444 of FIG. 6) that includes a first surface (e.g., a first surface 444a of FIG. 6) facing the first area and a second surface (e.g., a second surface 444b of FIG. 6) formed to extend under the first surface and configured to face the second area, and at least one lens (e.g., a lens 442 of FIG. 6) that is disposed in at least one of the first opening and the second opening; and an adhesive member (e.g., an adhesive member 450 of FIG. 6) disposed between the camera housing and the second area.

According to certain embodiments, the electronic device may further include a sealing member (e.g., a sealing member 460 of FIG. 6) disposed between the first area and the camera housing in a shape of a closed curve.

According to certain embodiments, the camera housing may include a body tube (e.g., a body tube 446 of FIG. 8) that is formed to extend from the first surface and is disposed in the first opening and the second opening.

According to certain embodiments, the at least one lens may be disposed in the body tube, and face the transparent area.

According to certain embodiments, the adhesive member may be formed of at least one of polyurethane, silicone, or an epoxy resin.

According to certain embodiments, the second area may be formed to surround at least a part of the camera module.

According to certain embodiments, the second area may include a third surface (e.g., a third surface 414a of FIG. 6) that faces the second surface, a fourth surface (e.g., a fourth surface 414b of FIG. 6) that is formed to be substantially parallel to the first surface, and a protrusion (e.g., a protrusion 414c of FIG. 6) that is formed on the fourth surface to protrude under the fourth surface.

According to certain embodiments, the adhesive member may be in contact with the second surface, the third surface, and the fourth surface, and join the camera housing to the support member.

According to certain embodiments, the transparent area may include a first transparent area (e.g., a first transparent area 424a of FIG. 7) that is formed at a position corresponding to the first opening, and a second transparent area (e.g., a second transparent area 424b of FIG. 7) that is located above the display, and the opaque area may be formed in a shape surrounding the first transparent area.

According to certain embodiments, the display may include a pixel layer (e.g., a pixel layer 434 of FIG. 6) for forming a screen, a first adhesive layer (e.g., a first adhesive layer 438a of FIG. 6) that joins the pixel layer with the front plate, a touchscreen panel (e.g., a touchscreen panel 436 of FIG. 6) for detecting an input of a user, and a second adhesive layer (e.g., a second adhesive layer 438b of FIG. 6) that joins the touchscreen panel with the support member, and the first opening may be formed to pass through at least a part of the pixel layer and at least a part of the touchscreen panel.

According to certain embodiments, the camera module may include an image sensor (e.g., an image sensor 480 of FIG. 8) directed in a first direction (e.g., a first direction (a +X direction) of FIG. 6) that faces an outside of the electronic device, and a first length (e.g., a first length L1 of FIG. 8) that is a length of the second area in the first direction may be shorter than a second length (e.g., a second length L2 of FIG. 8) that is a length of the second surface of the camera housing in the first direction.

According to certain embodiments, the support member may include a third area (e.g., a third area 416 of FIG. 8) that is disposed to be substantially parallel to the first area, the camera housing may include a fifth surface (e.g., a fifth surface 444c of FIG. 8) that faces the third area, and the fifth surface may be disposed apart from the third area.

According to certain embodiments, the adhesive member may not be in contact with the fifth surface of the camera housing.

According to certain embodiments of the disclosure, a manufacturing method of an electronic device includes: a first process of joining a front plate having a substantially transparent area and a substantially opaque area and a display having a first opening corresponding to at least a part of the transparent area to a support member; a second process of adjusting a position of a camera module relative to the support member through vision alignment in order to align a lens axis of the camera module to be substantially identical to a midpoint of the transparent area; a third process of disposing an adhesive member between the camera module and the support member; and a fourth process of curing the adhesive member.

According to certain embodiments, the vision alignment may be performed in a first direction which a lens of the camera module faces by light (e.g., light L of FIG. 10) which an external camera (e.g., a vision camera 510 of FIG. 10) emits in a second direction (e.g., a second direction (a −X direction) of FIG. 6) that is a direction opposite to the first direction.

According to certain embodiments, in the second process, the position of the camera module may be adjusted relative to the support member based on a jig for adjusting the position of the camera module.

According to certain embodiments, in the third process, the adhesive member may be disposed between the camera module and the support member in a fluid state.

According to certain embodiments, in the third process, the adhesive member may be disposed between the camera module and the support member on the basis of at least one of applying, injecting, or spraying.

According to certain embodiments, in the fourth process, the adhesive member may be cured by at least one of ultraviolet curing, natural curing, or hot air curing.

According to certain embodiments, an electronic device comprises a front plate including a transparent area and an opaque area; a display disposed under the front plate and including a first opening corresponding to at least a part of the transparent area; a support member disposed under the display and including a first area comprising a second opening corresponding to at least a part of the first opening and at least one second area protruding under the first area; a camera housing that includes a first surface facing the first area and a second surface extending under the first surface and facing the at least one second area, at least one lens disposed in at least one of the first opening and the second opening; and an adhesive member disposed between the camera housing and the second area; and wherein a bottom portion of the camera housing is separated by a gap from a third area of the support member disposed under the camera housing.

It will be apparent to those skilled in the art that the electronic device including the camera module of certain embodiments of the disclosure described above is not limited to the aforementioned embodiments and the drawings, and that various substitutions, modifications, and alterations are possible within the technical scope of the disclosure.

What is claimed is:

1. An electronic device comprising:
    a front plate including a transparent area and an opaque area;
    a display disposed under the front plate and including a first opening corresponding to at least a part of the transparent area;
    a support member disposed under the display and including a first area comprising a second opening corresponding to at least a part of the first opening and at least one second area protruding under the first area;
    a camera housing that includes a first surface facing the first area and a second surface extending under the first surface and facing the at least one second area,
    at least one lens disposed in at least one of the first opening and the second opening; and
    an adhesive member disposed between the camera housing and the second area,
    wherein the support member includes a third area substantially parallel to the first area, the camera housing includes a fifth surface facing the third area, and the fifth surface is disposed apart from the third area.

2. The electronic device of claim 1, further comprising a sealing member disposed between the first area and the camera housing in a shape of a closed curve.

3. The electronic device of claim 1, wherein the camera housing includes a body tube extending from the first surface and disposed in the first opening and the second opening.

4. The electronic device of claim 3, wherein the at least one lens is disposed in the body tube, facing the transparent area.

5. The electronic device of claim 1, wherein the adhesive member comprises at least one of polyurethane, silicone, or an epoxy resin.

6. The electronic device of claim 1, wherein the second area surrounds at least a part of the camera housing.

7. The electronic device of claim 1, wherein the at least one second area includes a third surface that faces the second surface, a fourth surface that is formed to be substantially parallel to the first surface, and a protrusion that is formed on the fourth surface and protruding under the fourth surface.

8. The electronic device of claim 7, wherein the adhesive member is in contact with the second surface, the third surface, and the fourth surface, and joins the camera housing to the support member.

9. The electronic device of claim 1, wherein:
    the transparent area includes a first transparent area located at a position corresponding to the first opening, and a second transparent area located above the display; and
    the opaque area is formed in a shape surrounding the first transparent area.

10. The electronic device of claim 1, wherein:
    the display includes a pixel layer forming a screen, a first adhesive layer that joins the pixel layer with the front plate, a touchscreen panel configured to detect an input of a user, and a second adhesive layer that joins the touchscreen panel with the support member; and
    the first opening passes through at least a part of the pixel layer and at least a part of the touchscreen panel.

11. The electronic device of claim 1, wherein:
    the camera housing includes an image sensor directed in a first direction that faces an outside of the electronic device; and
    a length of at least one the second area in the first direction is shorter than a length of the second surface of the camera housing in the first direction.

12. The electronic device of claim 11, wherein the adhesive member is spaced apart from the fifth surface of the camera housing.

13. A manufacturing method of an electronic device comprising:
    joining a front plate having a transparent area and an opaque area and a display including a first opening corresponding to at least a part of the transparent area to a support member;
    adjusting a position of a camera module relative to the support member by aligning a lens axis of the camera module to be substantially identical to a midpoint of the transparent area;
    disposing an adhesive member between the camera module and the support member; and
    curing the adhesive member,
    wherein the support member includes a first area comprising a second opening corresponding to at least a part of the first opening, at least one second area protruding under the first area, and a third area substantially parallel to the first area, the camera housing includes a fifth surface facing the third area, and the fifth surface is disposed apart from the third area.

14. The manufacturing method of claim 13, aligning the lens axis is performed in a first direction which a lens of the camera module faces by light which an external camera emits in a second direction that is a direction opposite to the first direction.

15. The manufacturing method of claim 13, wherein, adjusting the position of the camera module comprises adjusting the position of the camera module is adjusted relative to the support member with a jig.

16. The manufacturing method of claim 13, wherein, disposing the adhesive member comprises disposing the adhesive member is between the camera module and the support member in a fluid state.

17. The manufacturing method of claim 13, wherein, disposing the adhesive member comprises applying, injecting or spraying the adhesive member between the camera module and the support member.

18. The manufacturing method of claim 13, wherein curing the adhesive member comprises at least one of ultraviolet curing, natural curing, or hot air curing.

19. An electronic device comprising:
    a front plate including a transparent area and an opaque area;
    a display disposed under the front plate and including a first opening corresponding to at least a part of the transparent area;

a support member disposed under the display and including a first area comprising a second opening corresponding to at least a part of the first opening and at least one second area protruding under the first area;

a camera housing that includes a first surface facing the first area and a second surface extending under the first surface and facing the at least one second area, at least one lens disposed in at least one of the first opening and the second opening; and an adhesive member disposed between the camera housing and the second area; and wherein a bottom portion of the camera housing is separated by a gap from a third area of the support member disposed under the camera housing.

* * * * *